United States Patent [19]

Saari et al.

[11] 3,925,960

[45] Dec. 16, 1975

[54] ARTICLE COUNTING AND FILLING MACHINE

[75] Inventors: George W. Saari, Westminster; Ronald L. Belliveau, Fitchburg, both of Mass.

[73] Assignee: The Lakso Company, Incorporated, Fitchburg, Mass.

[22] Filed: Apr. 18, 1974

[21] Appl. No.: 462,107

[52] U.S. Cl. ........................ 53/78; 53/240; 141/155; 221/162
[51] Int. Cl.² .......................................... B65B 57/20
[58] Field of Search ..................... 141/93, 131–134, 141/183–191, 155, 167; 221/158, 162; 53/59 R, 78, 240

[56] References Cited
UNITED STATES PATENTS

| | | | |
|---|---|---|---|
| 2,974,773 | 3/1961 | Vaughan et al. | 221/158 |
| 3,354,607 | 11/1967 | Lakso | 53/78 |
| 3,713,527 | 1/1973 | Ginther | 221/162 |

*Primary Examiner*—Houston S. Bell, Jr.

[57] ABSTRACT

A machine for filling containers with discrete articles comprising a series of elongated slat members movable in a closed path, a portion of the slat members having an outer surface with a multiplicity of spaced apart cavities therein. The path comprises spaced apart cavity charging and discharging stations. Means at the charging station deposit articles in the cavities. The slat outer surfaces tilt at the discharge station for the simultaneous discharging of articles. Container delivery means continuously feed containers at a predetermined uniform speed along a line parallel to the direction of elongation of the slat members and below the level of slat members at the discharge station. A first set of stationary article-guiding chutes is disposed in side-by-side relation at said discharge station, each chute having an upper inlet and tapering to a narrowed outlet. A second set of chutes is supported for movement in a closed path, each chute being generally vertically disposed and having an upper inlet wider in the direction of chute travel than any first set chute outlet and a lower outlet smaller than its inlet. The closed chute path includes a portion extending the full length of the slat members with chutes in that path portion aligned with the container feeding line and the first set chute outlets. Drive means are provided for driving the container delivery means, for driving the chutes such that each chute moves with its outlet aligned with a moving container, and for driving the slat members.

1 Claim, 5 Drawing Figures

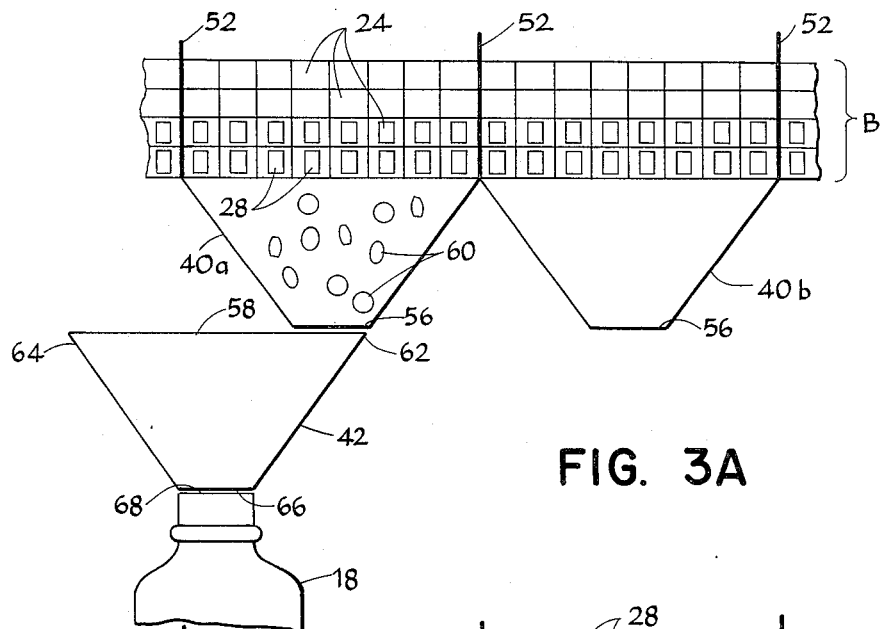
FIG. 3A
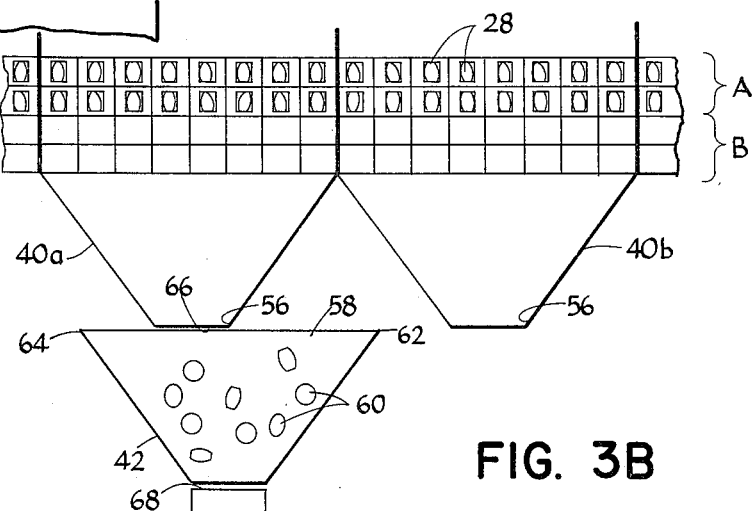
FIG. 3B
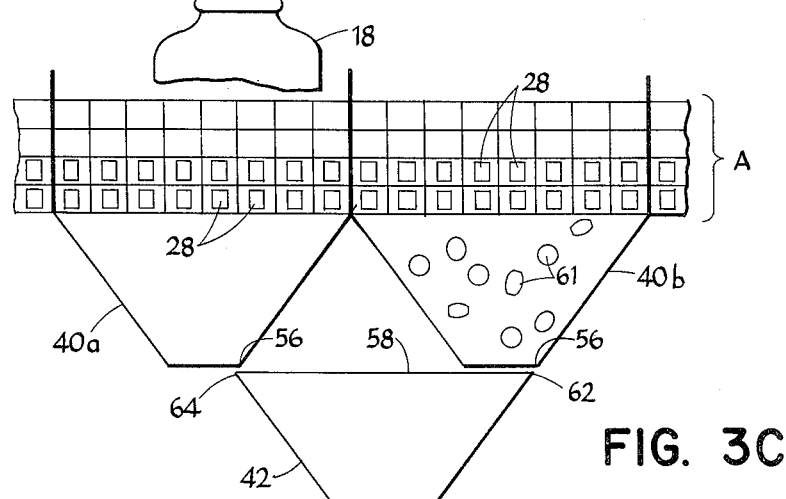
FIG. 3C
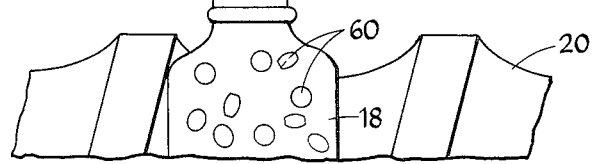

ARTICLE COUNTING AND FILLING MACHINE

This invention relates to a machine for the counting and filling of containers with discrete articles (e.g., tablets or capsules).

A principal object of the present invention is the provision of such a machine which, while utilizing a minimum of floor space provides for the rapid filling of containers with a precisely counted number of discrete articles and can operate "on-line" with other apparatus (e.g., downstream equipment such as cottoners, cappers, labelers, etc.).

A machine constructed according to the present invention includes a series of elongated slat members and means supporting those members for movement in a closed path in a direction generally transverse to the lengths of those members. The outer surfaces of some of the members are provided with a multiplicity of spaced apart cavities and the path which the members take in their movement includes spaced apart cavity charging and discharging stations. Upon reaching the discharge station, each slat member tilts for simultaneous discharge of the articles it carries. Container delivery means are provided for the feeding of containers at a predetermined uniform speed along a line parallel to the direction of elongation of the slat members and below the discharge station. Two sets of article guiding chutes are provided to deliver articles from the slat members at the discharge station to the traveling containers. The chutes of the first set are stationary and are disposed in side-by-side relation at the discharge station. Each such chute is positioned to receive articles discharged from a predetermined number of the cavities of each slat member reaching the discharge station. Each such chute also has an upper inlet portion and tapers to a narrow chute outlet. The second set of chutes is supported for movement in a closed path, each chute having an upper inlet which is wider in the direction of chute travel than any of the outlets of the first set of chutes. Each such chute also has a lower outlet which is smaller than its inlet. The closed chute path includes a portion extending the full length of the slat members and the moving chutes in that portion are aligned with both the container feeding line and the outlets of the first set of chutes. Finally, drive means are provided for synchronously driving various portions of the apparatus such that the container delivery means and the second set of chutes are both driven at the predetermined uniform speed mentioned above with each traveling chute outlet aligned with the mouth of a traveling container while the chute is in the above-mentioned path portion. The slat members are driven in synchronism with the chutes to release articles at the discharge station only when each traveling chute inlet is aligned with a fixed chute outlet.

In preferred embodiments of the invention the inlet of each chute in the second set has a leading edge and a trailing edge and the drive means are arranged to drive the slat members and the second set of chutes such that the discharge of articles from a slat member occurs only when each first set chute outlet is adjacent a second set chute inlet leading edge.

Other objects, features, and advantages of the invention will appear from the following description of a particular preferred embodiment taken together with the accompanying drawings thereof. In the drawings:

FIGS. 3A, 3B, and 3C are somewhat schematic front elevations of the portion of the apparatus shown in FIG. 2 illustrating successive stages in the delivery of tablets to a container.

Figure 1:
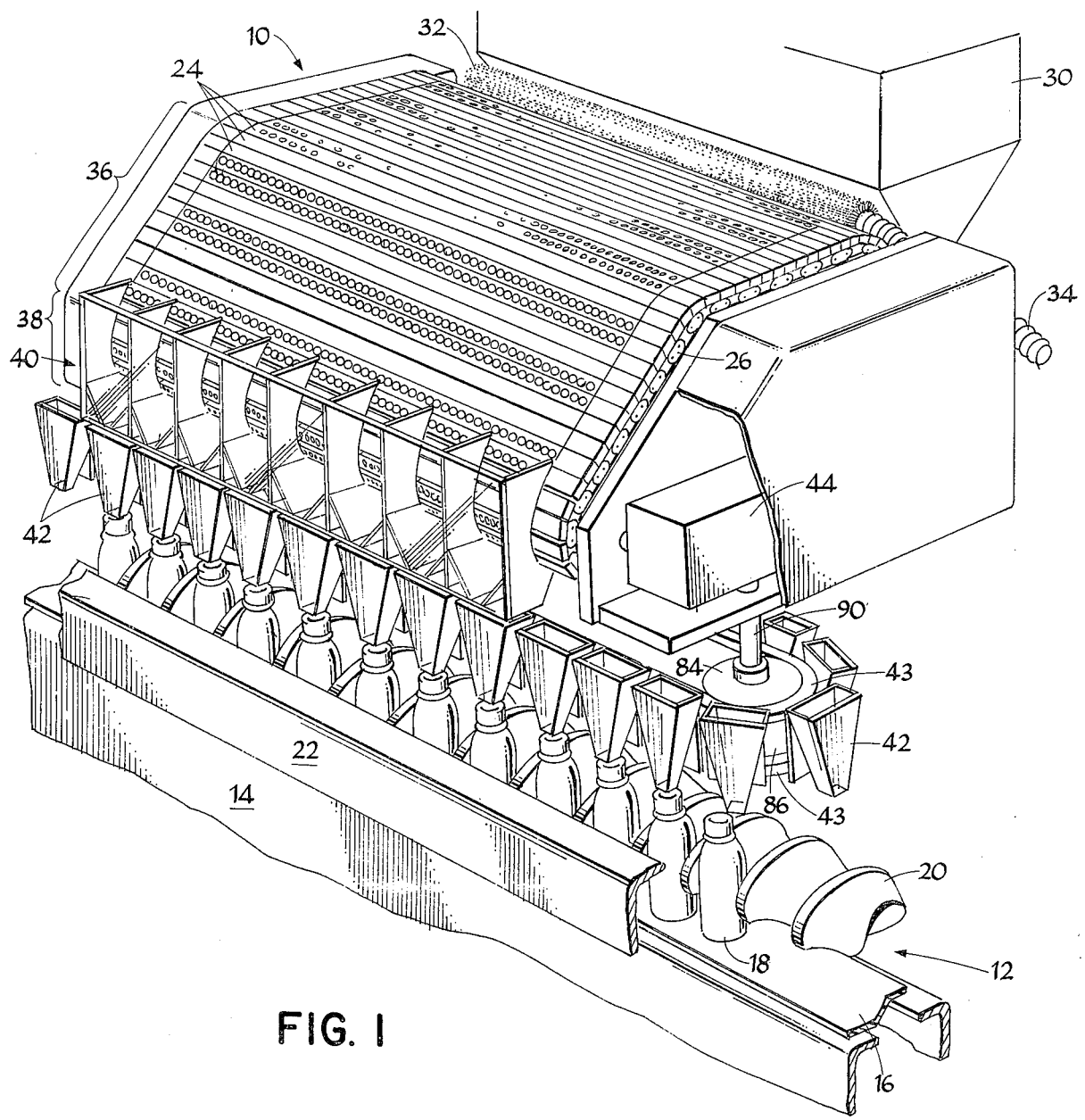
FIG. 1 is a partially broken away perspective view of apparatus constructed according to the present invention.

Referring to FIG. 1, the machine is shown looking from the filled bottle, or container out-feed, end and toward the container in-feed end. The apparatus comprises a product delivery portion 10 and a container delivery portion 12. The container delivery portion 12 includes a support 14 and a driven conveyor 16 on its upper, which supports containers 18. A large, horizontally mounted, driven screw 20 engages one lateral side of the containers 18 and a guide rail 22 the other lateral side. In the view of FIG. 1, the containers 18 move from left-to-right under the combined influence of the screw 20 and the conveyor 16.

The portion 10 of the apparatus comprises a multiplicity (e.g., 72) of elongated slat members 24 which are mounted for movement in a closed path in a direction generally transverse to the directions of elongation of the slat members and also generally transverse to the line of feed of containers 18 on the conveyor 16. Means, comprising chains 26 trained about suitably located sprockets, are provided for supporting the slat members for movement in a closed path. Certain of the slat members 24 have relatively smooth outer surfaces and certain of them are provided with spaced apart cavities of a predetermined shape and size to accept a single discrete item of the product (e.g., a tablet) which the apparatus is designed to handle. Preferably, the slat members 24 are removably supported on chains 26 so that they may be quickly replaced with other slat members having differently shaped cavities for the conversion of the apparatus to handle other products having different shapes. In one preferred embodiment discussed further below, the slat members may be viewed as occurring in groups of four, the first two of which are provided with cavities 28 (see FIG. 2) and the following two of which have no such cavities.

The path through which the slat members 24 travel includes a generally upwardly sloping rear portion (not visible in FIG. 1) which includes a charging station for the filling of the cavities 28 with tablets. Vibratory hopper 30 delivers tablets to this upwardly sloping portion and the vibrating tablets find their way into cavities until all the cavities are filled. A conventional hollow brush 32 is provided at the upper extreme of the charging station to prevent tablets not retained in cavities from traveling with the slat members and spilling over into the top of the apparatus and either onto the floor or into a container (thereby creating an incorrect count in the ultimately filled container). A vacuum pump (not shown) may be connected to the hollow interior of brush 32 by means of a hose 34 for the removal of the dust inevitably created by the rubbing of tablets over the apparatus or against each other.

The closed path also includes a front-facing, downward sloping portion 36. Here the tablets are gravitationally retained in the cavities in a location and orientation rendering them visible to the apparatus operator for inspection of the tablets in general and as a check on the continuing ability of the charging station to fill all cavities at any given rate of machine operation.

At the lower end of the sloping portion 36, the slat members reach a discharge station 38. Here the slats, following the path defined by chains 26, tilt so that their outer faces approach, reach, and then pass the vertical. This action, of course, causes the tablets to fall gravitationally from the cavities. A return portion of the closed path (not shown) leads the slat members to the lower end of the charging station.

A first set of stationary chutes 40 is provided adjacent the slat members 24 where they tilt to discharge the tablets. Thus, each tablet discharged from a slat member 24 will be guided, as it falls toward a container 18, by a single chute 40 of the first set. A second set of chutes 42 extends between the lower or outlet ends of chutes 40 and the mouths of containers 18. The chutes 42 are supported on chains 43 and are driven in a closed loop which is elongated in the direction of travel of the containers 18 and which has a straight front portion, aligned with the containers 18 extending at least the length of the set of chutes 40.

A drive unit 44 receives power from a motor (not shown) and is constructed, in any conventional fashion, to drive the conveyor 16 and screw 20 so as to convey containers 18 at a predetermined speed; to drive the chutes 42 at that same predetermined speed and in synchronism with the containers such that, while adjacent the apparatus 10, each container 18 has a chute 42 aligned with it; and to drive the slat members synchronously with the chutes 42 and at such a speed that tablet-containing slat members reach the discharge station 38 only when each chute 42 is aligned with a chute 40.

Figure 2:
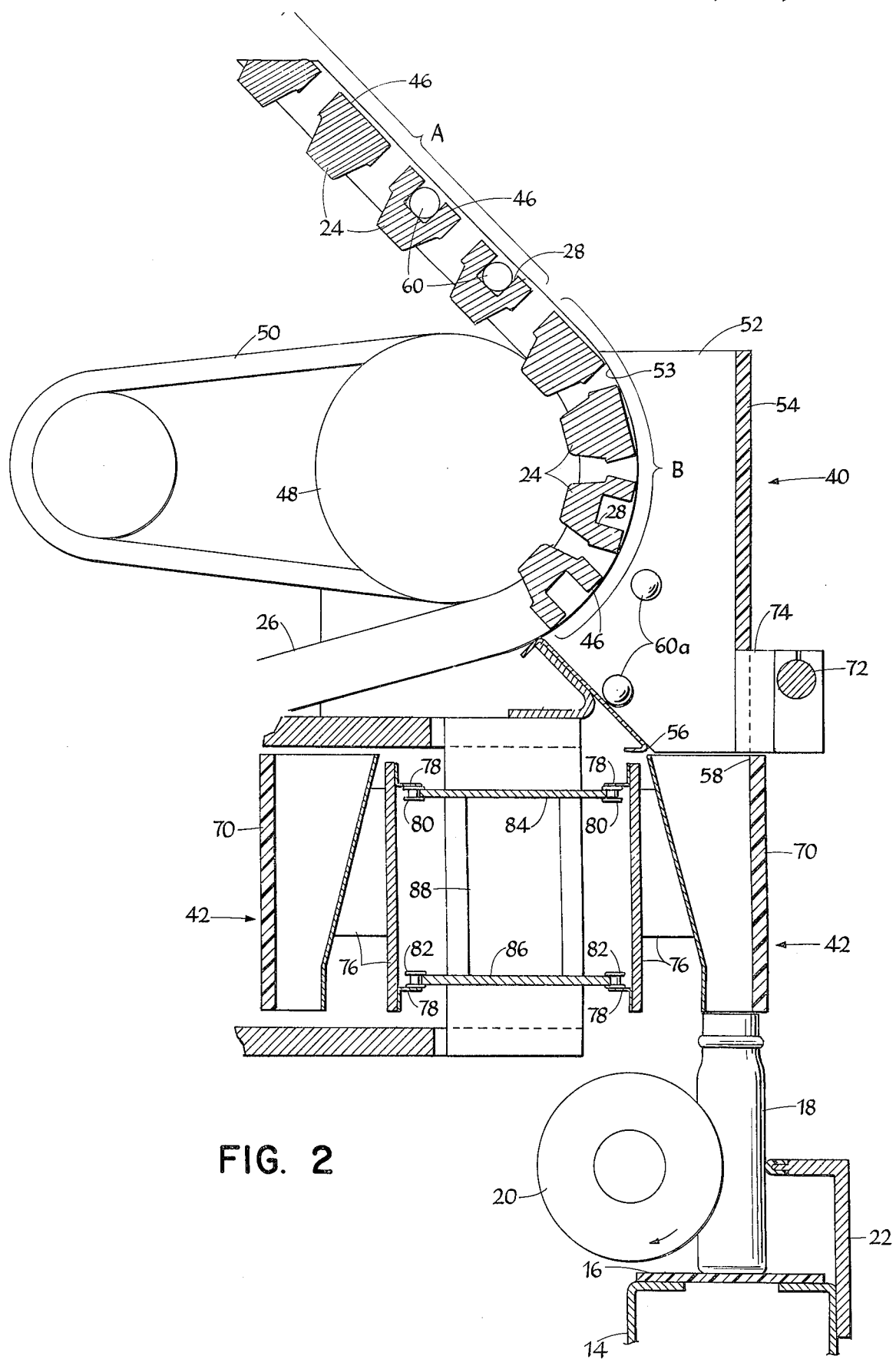
FIG. 2 is a somewhat schematic sectional elevation of the apparatus of FIG. 1 illustrating the discharge of tablets at the discharge station and the delivery of those tablets to the container to be filled.

The discharging of tablets at the discharge station, and the filling of the containers therewith, may best be described with reference to FIGS. 2, 3A, and 3C. Referring first to FIG. 2, there are shown two groups of slat members 24 (i.e., groups A and B). The slat members of group A are immediately upstream from the discharge station, while those of group B are at the discharge station and group B in the discharge area. The change in orientation of the outer surfaces 46 of slats 24 at the discharge station is defined by the change in the path of chain 26 as it passes around sprocket 48. The sprocket 48 may actually be the driven sprocket which in turn drives chain 26. This is indicated by the schematic representation of a chain 50 which drives the sprocket 48. The chutes 40 of the first upper set of stationary chutes are separated by dividers 52 which extend from an inner edge 53, curved to closely match the path of the slats 24, to an outer edge adjacent a transparent front face member 54. Each chute 40 tapers to a narrowed outlet 56 which has a front to back dimension (as seen in FIG. 2) substantially equal to the similar dimension of the inlet 58 of each chute 42 of the second set of traveling chutes. As indicated in FIG. 2, two of the slat members 24 of each group A and B have cavities 28 suitable for retaining tablets 60 therein, the tablets 60a having recently been discharged from the slats 24 of group B and now falling within the chute 40.

As best seen in FIG. 3A, the inlet 58 of each chute 42 is elongated in the direction of travel of the chute and has a leading edge 62 and a trailing edge 64. The chute 42 tapers to a narrowed outlet 66 which is aligned with, and substantially the same size as, the mouth 68 of container 18. The front panel of each chute 42 is preferably formed from a transparent material 70 to allow inspection of the interior of the chutes in order that the machinery may be stopped in the unlikely event of the tablets 60 becoming jammed in a chute.

The structure which supports two sets of chutes 40, 42 may also be described with reference to FIG. 2. The chutes 40 are supported by a rod 72 which extends the full length of the set of chutes and is secured at opposite ends to structural elements of the apparatus. Spaced apart keepers 74 are supported by the rod 72 and are secured to dividers 52. As will be realized by those skilled in the art, many alternative support schemes for chutes 40 are possible.

Each chute 42 is secured to a mounting bracket 76. The brackets are secured, by members 78 to upper and lower chains 80, 82. At each end of the loop in which the chutes 42 travel, the chains 80, 82 are trained about upper and lower sprockets 84, 86 which may be secured to a common shaft 88. The sprockets adjacent the drive unit 44 (see FIG. 1) are driven by that unit through a shaft 90.

The filling of containers 18 and the synchronous operation of the slat members 24 may best be described with reference to FIGS. 3A, 3B, and 3C. In these somewhat schematic representations, the four slat members of group B are illustrated at the top of FIG. 3A with the lower two slat members being those having cavities and the upper two being blank or spacer slats. When the tablet-containing slats of group B have just dumped their tablets into the upper chutes 40, a traveling chute 42 has its leading edge 62 adjacent the outlet 56 of the first chute 40a, in the direction of chute 42 travel, of two adjacent fixed chutes. At this time the tablets 60, having just been released, are falling through the chute 40a. By the time the traveling chute 42 has moved to the position shown in FIG. 3B, the tablets 60 will have dropped into the chute 42. At the same time, the slat members 24 have advanced such that the spacer slats are at the critical portion of the discharge area and the tablet-containing slats of the next group (group A) have yet to reach that critical area. In FIG. 3C, the chute 42 and container 18 have advanced such that the leading edge 62 of inlet 58 is adjacent the outlet 56 of stationary chute 40b ready to receive, from chute 40b, tablets 61 discharged by group A slat members. Meanwhile, the tablets 60 originally discharged into chute 40a have passed from the traveling chute 42 into the container 18. At high rates of machine operation (i.e., high rates of travel of chutes 42), the synchronism of slat member movement with the movement of chutes 42 becomes increasingly important. In such circumstances the dumping of tablets from each slat member will have to be timed to "lead" the chutes 42 (i.e., dumping of tablets from a slat member prior to the time when chute edges 56 and 62 become aligned), thereby allowing time for the tablets to fall under the influence of gravity to be in the appropriate locations at the appropriate times, as indicated in FIGS. 3A, 3B, and 3C.

In one particular preferred embodiment of the invention, there are ten chutes 40 in the upper or first set of chutes, thus dividing the tablets from each group of slat members 24 among ten separate chutes for depositing into ten separate containers. In this embodiment each container 18 will receive ten separate "doses" as it travels the length of the apparatus. It is, of course, not necessary that the same number of tablets be delivered in each dose. For example, in the embodiment described above, in which the slat members occur in groups of four with the first two of those four slat members including cavities 28 for retaining tablets 60, to fill each container 18 with 150 tablets, certain cavities in the slat members may be blocked. Thus, although each chute 40 is aligned with a portion of each slat member that includes eight cavities, the slat members have certain cavities blocked such that alternate chutes 40 receive 14 and 16 tablets per dose (i.e., 7 tablets from each of two slat members and 8 tablets from each of two slat members). With this arrangement, a container receiving doses from each of the ten chutes 40 (i.e., five doses of 14 tablets and 5 doses of 16 tablets) will be filled with 150 tablets.

While a particular preferred embodiment of the invention has been illustrated in the accompanying drawings and described in detail herein, other embodiments are within the scope of the invention and the following claims.

What is claimed is:

1. In a machine for filling containers with discrete articles comprising a series of elongated slat members, means supporting said slat members for movement in a closed path in a direction generally transverse to the lengths thereof, at least some of said slat members having outer surfaces with a multiplicity of spaced apart cavities therein, said path including spaced apart cavity charging and discharging stations, means at said charging station for depositing articles in said cavities, the outer surface of each slat member tilting at said discharge station to discharge simultaneously all articles from the cavities therein, a first set of article-guiding chutes disposed in side-by-side relation, each chute positioned to receive articles discharged from a predetermined number of the cavities of each slat member when it reaches said discharge station, each chute having an upper inlet and a lower outlet, a second set of article-guiding chutes, disposed beneath said first set of chutes, each chute of said second set having an upper inlet of predetermined size and a lower outlet which is smaller than the inlet, container delivery means for delivering containers along a container path which passes beneath chutes of said second set, and drive means for driving said container delivery means and said slat members, the improvement wherein, means are provided for supporting said second set chutes for movement in a closed loop having a loop portion that extends the full length of said slat members, said loop portion being in vertically spaced alignment with said first set of chutes, each said second set chute inlet having a leading edge and a trailing edge spaced apart by a distance greater than the corresponding dimension of any first set chute outlet, said drive means are connected to drive said delivery means continuously to provide a continuous uniform speed of container movement along said container path and to drive said second set chutes in synchronism with said containers at said uniform speed, whereby, as each chute traverses said loop portion, its outlet is in vertically spaced alignment with a container mouth, said drive means arranged to drive said slat members at a rate dependent upon said uniform speed and in synchronism with said second set of chutes so that discharge of articles at said discharge station occurs only when each second set chute is positioned to receive articles from a first set chute outlet.

* * * * *